(12) United States Patent
Klein Middelink et al.

(10) Patent No.: US 7,039,850 B2
(45) Date of Patent: May 2, 2006

(54) PROTECTION OF STREAMING A/V DATA

(75) Inventors: Marc Willem Theodorus Klein Middelink, Eindhoven (NL); Ralf Franciscus Magdalena Funken, Eindhoven (NL); Arnoldus Werner Johannes Oomen, Eindhoven (NL); Leon Maria Van de Kerkhof, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

(21) Appl. No.: 10/210,401

(22) Filed: Aug. 1, 2002

(65) Prior Publication Data

US 2003/0033569 A1    Feb. 13, 2003

(30) Foreign Application Priority Data

Aug. 3, 2001   (EP) ................... 01202956

(51) Int. Cl.
*H03M 13/00*   (2006.01)
*G06F 11/00*   (2006.01)

(52) U.S. Cl. ....................... 714/776; 714/746
(58) Field of Classification Search ............... 714/776, 714/746, 752, 758; 375/240.01, 240.24, 375/246
See application file for complete search history.

(56) References Cited

U.S. PATENT DOCUMENTS 5,990,967 A * 11/1999 Kawakami et al. ......... 348/500
6,587,477 B1 * 7/2003 Takeda et al. .............. 370/468

FOREIGN PATENT DOCUMENTS

| EP | 0827312 A2 | 3/1998 |
| EP | 1014730 A1 | 6/2000 |
| EP | 1137005 A2 | 9/2001 |

OTHER PUBLICATIONS

Seytter: "An efficient multiplex architecture for mobile MPEG-4 systems—Image Communication" Signal Processing. Image Communication, Elsevier Science Publishers, vol. 14, No. 6-8, May 1999, pp. 599-606.
MPEG2-AAC, ISO/IEC 13818-7, 1997, pp. 1-63.
MPEG4-AAC, ISO/IEC 14496-3, 1999, pp. 1-31.

* cited by examiner

*Primary Examiner*—Shelly Chase

(57) ABSTRACT

A frame structure is provided for streaming A/V data providing improved protecting and opportunities for concealing errors. The frame structure includes a header block and a plurality of sub-blocks. Each of the sub-blocks includes digitally encoded audio/video data corresponding to predetermined consecutive periods of the A/V signal. The sub-blocks are generally of variable length. For the header block and each of the sub-blocks a respective associated error protecting code is present in the frame for protecting the associated block during transmission. The header block also includes a location information field that provides information on the location of at least one of the sub-blocks in the frame.

12 Claims, 3 Drawing Sheets

"Prior Art"

PROTECTION OF STREAMING A/V DATA

The invention relates to protection of A/V data against transmission/storage errors, in particular for streaming of A/V data.

Distribution of A/V (audio and/or video) data via a storage or transmission medium has become very important. For example, the success of Internet has led to the transmission of huge numbers of MP3 encoded audio titles. Instead of a file download, streaming with real-time consumption of the received data is expected to increase, particularly in combination with wireless transmission. The bandwidth requirements for streaming of relatively high quality encoded audio or video signals are significant, making it important to control the overhead involved in the transmission. Since the reliability of the transmission medium, in particular of a wireless medium, can be relatively low, care has to be taken in detecting transmission errors and acting upon detected errors. For instance, an error occurring in short period of the transmitted A/V signal may be concealed by interpolation between two neighboring signal periods or by using other suitable measures.

Sections 6.2 and 8.1 of the ISO/IEC Advanced Audio Coding (AAC) standard 13818-7 (MPEG2-AAC) and section A 2.2 of subpart 1 of the ISO/IEC standard 14496-3 (MPEG4-Audio) describe a format for transmission of coded audio streams, the so-called audio data transport stream (ADTS) frame. An audio stream consists in this case of a sequence of ADTS frames. The ADTS frame, as shown in FIG. 1, includes a header block 10 and payload field 20. The header block 10 includes a fixed header 12 and a variable header 14. The fixed header 12 contains information that is the same for all frames in the sequence, such as a sampling frequency of the audio. It is transmitted in every frame to enable random access into the bit-stream. The fixed header also contains a synchronization word. The variable header contains header information that may change from frame to frame. One of the elements of the variable header is the frame length that contains the length L of the frame. The payload field 20 can contain up to 4 sub-blocks (22, 24, 26, 28) of raw audio data, where each sub-block represents a fixed number of audio samples per channel (e.g. 1024 in MPEG2-AAC).

During transmission of the encoded bit-stream, bit-errors can occur due to unfavorable transmission conditions. Such errors can render a bit-stream invalid resulting in a highly distorted output of the decoder. To overcome such problems, the standards have specified that optionally the header block and the actual encoded audio in the sub-block may be protected using an error protecting code 30, that can be inserted in the frame as well. A Cyclic Redundancy Check (CRC) is used as error protecting code. The CRC can be used to correct transmission errors. For highly distorted transmission channels, the CRC may not be sufficient to correct the errors, but may still be used to flag an invalid segment of the data. In that case, the decoder can take proper error concealment measures for that particular data segment. It will be understood that for AV streaming, where normally received data is rendered in 'real-time', there is usually no time to perform a retransmission of data when an error has been detected.

At this moment the MPEG AAC-ADTS frame format is used for transmitting encoded audio using only one sub-block per frame. Typically, the optional error protection using the CRC is applied. As is shown in FIG. 1A, in the case of one sub-block per frame, the CRC code 30 is calculated over the fixed header 12, the variable header 14 and the sub-block 22. The header (consisting of the fixed and variable header) of the frame has a fixed length, simplifying decoding. To reduce the transmission overhead it is desired to use the option provided by the standards to include more than one sub-block in an ADTS frame. However, the standards do not provide a clear description on protection of data in the case of multiple sub-blocks in an ADTS frame. The scope of protection of the one specified CRC may be extended over all sub-blocks in the frame as is shown in FIG. 1b. Doing so, would imply that a single bit error anywhere in the header or the sub-blocks renders all sub-blocks unusable. This makes concealment of errors difficult, if not impossible.

It is an object of the invention to provide a frame format suitable for streaming of encoded A/V data, where the frame includes a plurality of data sub-blocks while limiting the impact of transmission errors.

The object of the invention is achieved by using a frame structure where each frame includes a header block and a plurality of sub-blocks; each of the sub-blocks including digitally encoded audio/video data corresponding to predetermined consecutive periods of the A/V signal; the sub-blocks may have a variable length; wherein the frame includes for the header block and each of the sub-blocks a respective associated error protecting code for protecting the associated block during transmission; and the header block includes a location information field providing information on the location of at least one of the sub-blocks in the frame. By separately protecting each of the sub-blocks, corrective measures can be taken for each sub-block separately. By also using a separate protection of the header, which is usually relatively short compared to the sub-block, errors in the header can be detected separately. An error in the first sub-block will not make the header block unusable and as such header information can still be used for processing the other sub-blocks. The error protecting codes preferably enable reliable detection of several bit errors. Preferably, more protection is given to the headers by applying a stronger channel code to them. According to the invention, the frame supports transfer of variable-size sub-blocks. To make it possible to skip only those sub-blocks that are erroneous, location information is present to enable locating correct sub-blocks. The location information is inserted in the header block and protected by the header error protecting code. The location information may take any suitable form, such as an off-set from the beginning of the frame. Also lengths of the sub-blocks may be specified, where the start position of a sub-block is derived from a start position of a previous sub-block and the length of that sub-block.

According to the measure of the dependent claim 2, the error protecting codes are placed immediately adjacent, and preferably, immediately following the block it protects. This enables simple processing without delays.

According to the measure of the dependent claim 3, the length of the header block is known to the receiver (or more in general: the total length of all frame elements preceding the sub-blocks is known). To benefit from this information, the location information does not need to include the position of the first sub-block following the header. Also the total length of the frame is known for a frame, enabling to locate the position of the next frame.

According to the measure of the dependent claim 4, the header block is fixed-size. Consequently, the position of the first block is implicitly known and no extra information is required. If the header block were not fixed-size, preferably information on the length of the header is inserted in the header block itself (preferably at a predetermined location).

The frame is preferably used for wireless transmission and reception and streaming (transmitting and receiving) of encoded A/V signals. Specifically, the frame is very useful for broadcast audio and TV as well as for Internet Radio. The frame may also be used for storage of encoded A/V signals, particularly when random access to the frames is required.

These and other measures will be described in more detail with reference to the figures.

Figure 1A:
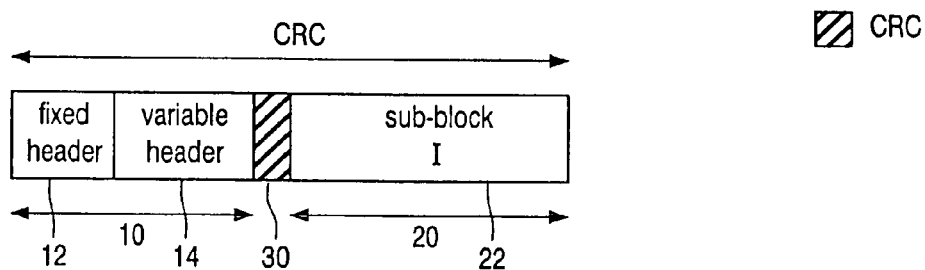
FIG. 1 shows the prior art frame structure.
Figure 1B:
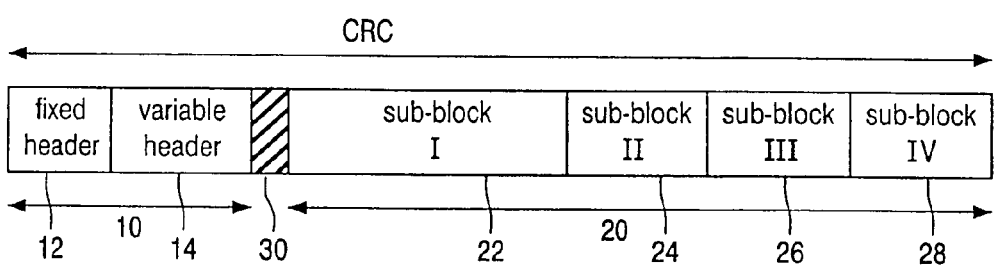

FIG. 1A shows the prior art frame structure for a frame with one sub-block 22. FIG. 1B shows the frame structure as would follow from the syntax in the MPEG AAC standards for the example of four sub-blocks 22, 24, 26, and 28 in the payload field 20 of the frame. In this case, the CRC of field 30 of the frame covers the header block 10 (with the fixed header 12 and the variable header 14) and all sub-blocks in the frame. Since the sub-blocks are usually rather long and substantially longer than the header, the likelihood is high that a detected error occurred in one of the sub-blocks. However, since it cannot be known where the error is located, the header is unreliable, making processing of the entire frame impossible.

Figure 2:
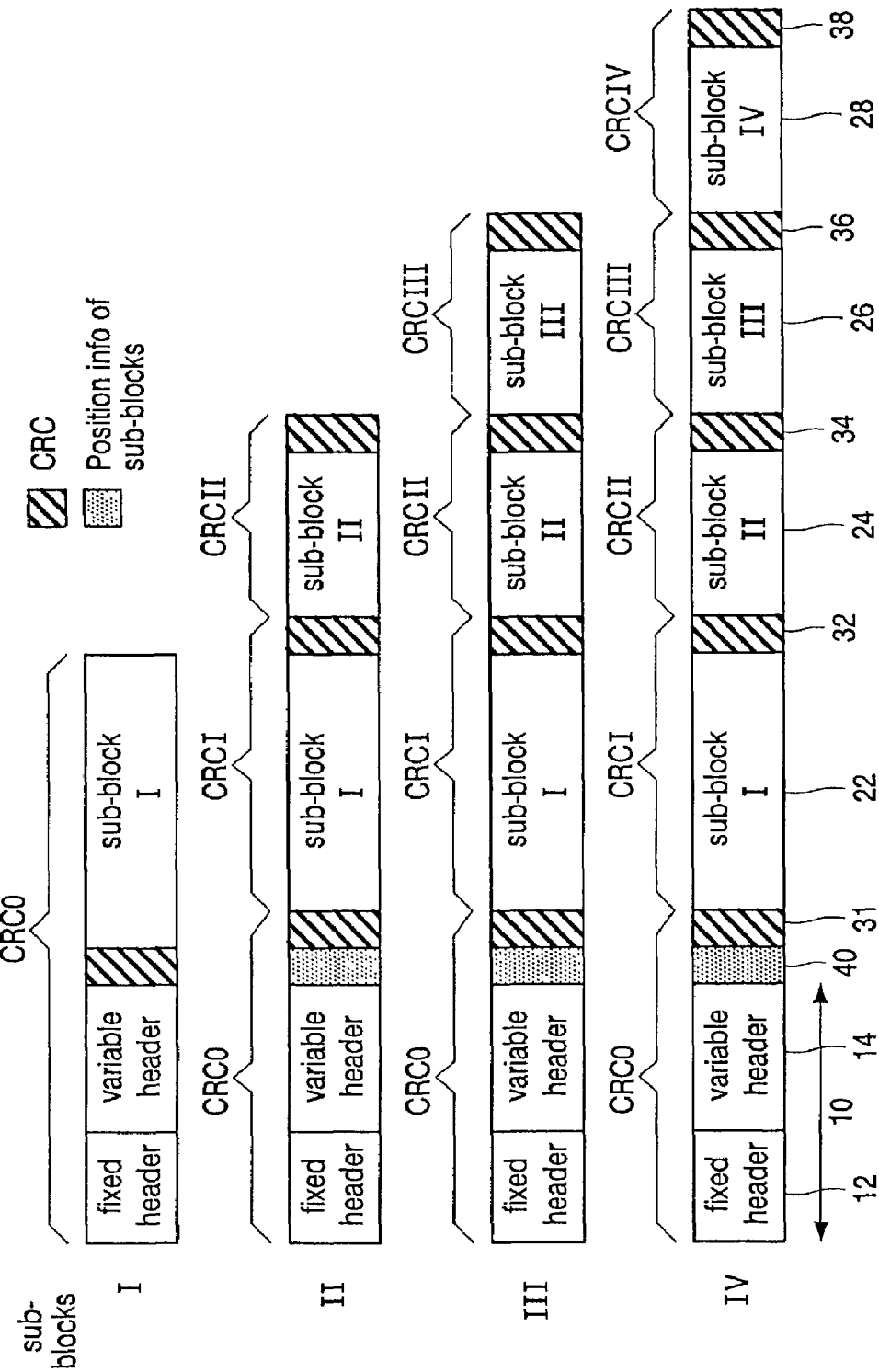
FIG. 2 illustrates the frame structure according to the invention.

FIG. 2 shows the frame structure according to the invention. FIG. 2-I illustrates the prior art situation for one sub-block. For reasons of compatibility with existing implementations it is preferred that this frame structure is maintained for a frame with one sub-block. FIGS. 2-II to IV illustrate the frame structure for frames with respectively 2, 3 and 4 sub-blocks (in general: N sub-blocks where N>1). In FIG. 2-IV the payload field 20 of the frame includes four sub-blocks 22, 24, 26, and 28. According to the invention, the header block 10 is protected by a separate error protecting code 30 included in the frame instead of the prior art CRC 30 of FIG. 1. For reasons of compatibility and simplicity, the same CRC may be used as prescribed by the MPEG AAC standards. Since an unrecoverable error in the header block makes processing of the entire frame impossible, preferably, a stronger channel code is used. As is also illustrated, each sub-block is accompanied by an associated error protecting code covering that sub-block. These codes are also included in the frame. In the example of FIG. 2-IV sub-block 22 is protected by code 32, block 24 by code 34, block 26 by code 36 and block 28 by code 38. Preferably the CRC specified by the MPEG AAC standards is used as an error protecting code for the sub-blocks. Other codes may be used as well.

In a preferred embodiment, the error protecting codes are adjacent to and, preferably, immediately follow, the block protected by the code. This makes checking the code possible without unnecessary delay.

According to the invention the sub-blocks may be variable length. It will be appreciated that, for a specific application, also fixed length sub-blocks may be transmitted, whereas at an other moment for another application other size sub-blocks are transmitted. Also, within one application the length of the sub-blocks may inherently vary in time. The variation in length may lie in the level of compression. For the preferred use of the frame for MPEG AAC a sub-block represents e.g. 1024 audio samples. For high bit rate coding (for streaming over high bandwidth channels), the bit rate may e.g. be 128000 bits/sec at a sampling frequency of 48000 Hz. The average length of a sub-block is then 1024*128000/48000=2730.666 bits, or (approximately) 342 bytes, but varies per sub-block. For low bit rate coding (for streaming over low bandwidth channels), the bit rate may e.g. be 32000 bits/sec at a sampling frequency of 32000 Hz. The average length of a sub-block is then 1024*32000/32000=1024 bits, or 128 bytes, but again varies per sub-block. For MPEG AAC the length of the header block (containing the fixed and variable header) is always 7 bytes.

Even for a low-bit rate, the header is preferably substantially smaller than the sub-block (to reduce the overhead caused by the header block). Preferably, the length of the header block is at least 10 times smaller than the length of an average sub-block. By using relatively large sub-blocks compared to the header, an error in the frame will most likely be in one of the sub-blocks. By protecting the header block separately, with a high likelihood the header block is still useable even if errors are detected in the frame. With the assistance of the sub-block error protecting codes and the location information, the valid sub-blocks can be located and processed further whereas the invalid sub-block(s) are discarded.

According to the invention, the frame includes position information 40 that enables locating the position of the variable size sub-blocks. For frames such as the MPEG AAC wherein the length of all elements preceding the sub-blocks is known (in the case of MPEG-AAC the length is predetermined; as an alternative the length information could also be inserted into or sent with the frame), it is not necessary to specify the position of the first sub-block 22. In such a case, information on the location of the sub-blocks II through N in a frame is added, preferably in the form of an offset in bytes with respect to the start of the sub-block I. The position of sub-block I is implicit (directly after the headers). The location information allows decoding of sub-blocks in the case previous sub-blocks have been found invalid.

In a preferred embodiment, the location information is inserted in the header block and protected by the header error protecting code. To fit optimally with the existing implementations of the MPEG AAC frame format with one sub-block, the location information is included at the last position of the variable header. The existing CRC 30 is kept at the same location, but now only protects the fixed header, the variable header and the location information but no longer the first sub-block.

The syntax description of a preferred frame structure is as follows (using the syntax notation of MPEG AAC):

```
adts_frame( )
{
    adts_fixed_header( ) ;
    adts_variable_header( ) ;
    if (number_of_raw_data_blocks_in_frame == 0)  {
        adts_error_check( ) ;
        raw_data_block(0) ;
        byte_alignment( ) ;
    } else {
        adts_header_error_check( ) ;
        for( i = 0; i <= number_of_raw_data_blocks_in_frame;
        i++ ) {
            raw_data_block(i) ;
            adts_raw_data_block_error_check(i) ;
            byte_alignment( ) ;
        }
    }
}
adts_header_error_check ( )
{
    if ( protection_absent == '0' ) {
        for( i = 1; i <= number_of_raw_data_blocks_in_frame;
        i++ ) {
            raw_data_block_position(i)            16
        }
        crc_check;                                16
    }
}
adts_error_check( )
{
    if ( protection_absent == '0' ) {
        crc_check;                                16
}
```

-continued

```
adts_raw_data_block_error_check(i)
{
    if ( protection_absent == '0' ) {
        crc_check;                                          16
}
```

Definitions:
raw_data_block_position (i): start position of raw_data_block(i) measured as an offset in bytes from start position of raw_data_block(0).
adts_error_check ( ): equal to definition in ISO/IEC 13818-7.
adts_header_error_check ( ): CRC error detection data generated as described in ISO/IEC 11172-3, subclause 2.4.3.1 (Table 6.7). The following bits are protected and fed into the CRC algorithm in order of their appearance:
all bits of adts_fixed_header( )
all bits of adts_variable_header( )
all bits of all raw_data_block_position fields.
adts_raw_data_block_error_check (i): CRC error detection data generated as described in ISO/IEC 11172-3, subclause 2.4.3.1 (Table 6.7). The following bits of raw_data_block(i) are protected and fed into the CRC algorithm in order of their appearance:
First 192 bits of any single_channel_element (SCE), channel_pair_element (CPE), coupling_channel_element (CCE), low frequency enhancement channel (LFE)
First 128 bits of the second individual_channel_stream (ICS) in the channel_pair_element must be protected.
All information in any program_configuration_element (PCE) or data_stream_element (DSE) must be protected. For any element where the specified length of 128 or 192 bits exceeds its actual length, the element is zero padded to the specified length for CRC calculation.
The id_syn_ele bits shall be excluded from CRC protection. If the length of a CPE is shorter than 192 bits, zero data are appended to achieve the length of 192 bits. Furthermore, if the first ICS of the CPE ends at the Nth bit (N<192), the first (192−N) bits of the second ICS are protected twice. For example, if the second ICS starts at the 190th bit of CPE, the first 3 bits of the second ICS are protected twice. Finally, if the length of the second ICS is shorter than 128 bits, zero data are appended to achieve the length of 128 bits.

Figure 3:
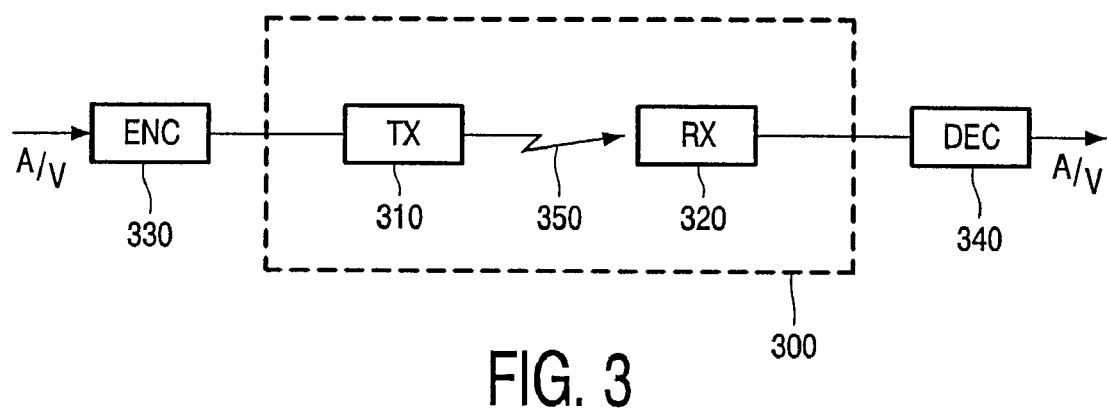
FIG. 3 shows a transmission system according to the invention.

FIG. 3 shows a transmission system 300 according to the invention. The A/V signal is fed to an encoder 330. The encoder 330 includes an input for receiving a plurality of digitally encoded audio/video data sub-blocks, where each sub-block corresponds to predetermined consecutive periods of the A/V signal. As described above, the sub-blocks generally have a variable length. The sub-blocks are typically received in a substantially continuous stream of successive blocks. The encoder 330 is operative to generate the header block. The header block includes information on the A/V data blocks to be encoded (e.g. sampling rate). Some of this information may be supplied separately to the encoder. The information includes location information on the location of the sub-blocks to be included in the frame. The encoder preferably determines this information from length information of the individual sub-block supplied at the input. Such length information may be supplied separately or may be implicit in other information. The encoder 330 calculates for the header block an associated header error protecting code for protecting the header block during transmission and/or storage. The encoder 330 also calculates for each of the respective A/V data sub-blocks a respective associated sub-block error protecting code for protecting the associated sub-block block during transmission and/or storage. A conventional software routine or hardware circuit may be used for calculating the error protecting code. The encoder builds in a memory the entire frame structure according to the invention and passes it on to a transmitter 310. Usually one integrated encoder is used for generating the sub-blocks and attaching the headers and error protecting codes. Typically the encoder is implemented in software, using a DSP or similar type of microprocessor. The software may be embedded in the encoder. A person skilled in the art will also be able to build a suitable hardware implementation of the encoder. The transmitter may implement any desired communication protocol to transmit the frame via a communication medium 350 (e.g. via Internet) to an end receiver 320. The receiver 320 supplies the received information to a decoder 340.

The decoder 340 includes an input for receiving the frame including the header block, the associated header error protection code, and the plurality of data sub-blocks and respective associated sub-block error protection codes. The header block includes information on the data sub-blocks in the frame, among others the location information on the location of at least one of data sub-blocks in the frame. The decoder 340 verifies whether the header error protecting code corresponds to the header block. This may be done by calculating the error protecting code for the received header block and comparing this to the received header error protecting code. If an error is detected, the decoder 340 terminates processing of the frame. The decoder 340 locates the data sub-blocks at least partially under control of the location information in the header block as described above. The decoder verifies for each of the respective data sub-blocks whether the respective associated sub-block error protecting code corresponds to the data sub-block (e.g. by calculating the code and comparing this to the received code). Erroneous sub-blocks are discarded and the correct sub-blocks are kept by extracting an encoded A/V signal from each sub-block for which no error was detected. The encoded A/V signal is decoded further in a manner suitable for the specific form of encoding (e.g. MPEG 2 encoding). This further decoding may be done by the decoder 340 or by an external decoder. Typically the decoder is also implemented in software on a suitable processing platform.

Preferably, erroneous frames or sub-blocks are not simply discarded but measures are take to conceal such errors, by replacing the erroneous frame or sub-block by an estimated frame or sub-block. Any known concealment method (e.g. interpolation) may be used.

Figure 4:
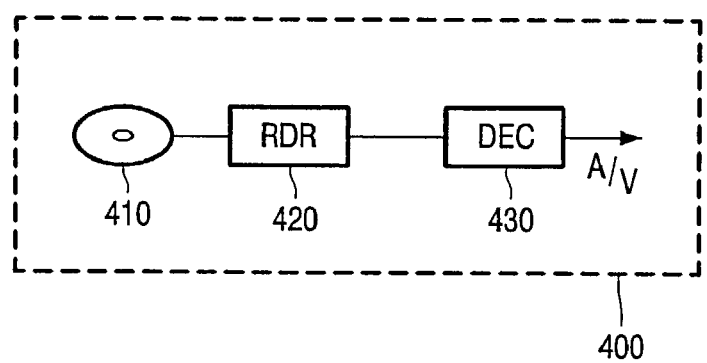
FIG. 4 shows a decoder apparatus with a record carrier on which the frame structure is recorded.

FIG. 4 shows a decoder apparatus 400 with a storage medium 410 on which the frame structure is recorded. Any storage medium (including record carriers) may be used, e.g. optical, magnetic, magneto/optical, solid state, etc. The reader 420 reads one or more frames from the storage 410 and supplies it to the decoder 430. The decoder 430 can be the same as described for decoder 340 of FIG. 3. The reader 420 matches the storage medium. The storage medium 410 may be located fixed in the decoder apparatus 400. Also removable storage media may be used (e.g. optical disc, flash memory cards) carrying the frames according to the invention.

The invention claimed is:
1. A system including a transmitter and a receiver for transmitting an A/V signal in the form of a stream of frames, where each frame includes a header block and a plurality of sub-blocks; each of the sub-blocks including digitally encoded audio/video data corresponding to predetermined consecutive periods of the A/V signal; the sub-blocks may have a variable length; wherein the frame includes gener- ating the header block and each of the sub-blocks, and computing a respective associated error protecting code for protecting the associated block during transmission; and the header block includes a location information field providing information on the location of at least one of the sub-blocks in the frame.

2. A system as claimed in claim 1, wherein each of the error protecting codes is located immediately adjacent to the associated block protected by the code.

3. A system as claimed in claim 1, wherein the location information field provides information on the position of all but the first one of the sub-blocks and wherein the position of the first sub-blocks is derived from a total length of the frame preceding the sub-blocks.

4. A system as claimed in claim 3, wherein the total length of all elements in the frame preceding the sub-blocks is predetermined.

5. A method of encoding an A/V signal in the form of a stream of frames, including:
receiving a plurality of digitally encoded audio/video data sub-blocks, each corresponding to predetermined consecutive periods of the A/V signal, the sub-blocks may have a variable length;
generating a header block, including information on the A/V data blocks to be encoded in one frame; the information including location information on the location of at least one of the sub-blocks to be included in the frame;
calculating for the header block an associated header error protecting code for protecting the header block during transmission and/or storage;
for each of the respective A/V data sub-blocks calculating a respective associated sub-block error protecting code for protecting the associated sub-block block during transmission and/or storage;
forming and transmitting and/or storing a frame including the header block, the associated header error protection code, and each of the data sub-blocks and respective associated sub-block error protection codes.

6. An encoding apparatus including:
an input for receiving a plurality of digitally encoded audio/video data sub-blocks, each corresponding to predetermined consecutive periods of the A/V signal, the sub-blocks may have a variable length;
means for generating a header block, including information on the A/V data blocks to be encoded; the information including location information on the location of at least one of the sub-blocks to be included in the frame;
means for calculating for the header block an associated header error protecting code for protecting the header block during transmission and/or storage;
means for calculating for each of the respective A/V data sub-blocks a respective associated sub-block error protecting code for protecting the associated sub-block block during transmission and/or storage; and
means for forming and transmitting and/or storing a frame including the header block, the associated header error protection code, and each of the data sub-blocks and respective associated sub-block error protection codes.

7. Method of decoding an A/V signal in the form of a stream of frames, including:
receiving a communication frame including a header block, an associated header error protection code, a plurality of data sub-blocks and respective associated sub-block error protection codes; the header block including information on the data sub-blocks in the frame; the information including location information on the location of at least one of data sub-blocks in the frame; each of the data sub-blocks corresponding to predetermined consecutive periods of the A/V signal, the sub-blocks may have a variable length;
verifying whether the header error protecting code corresponds to the header block; and terminating processing of the frame if no correspondence is found;
locating the data sub-blocks at least partially under control of the location information in the header block;
for each of the respective data sub-blocks, verifying whether the respective associated sub-block error protecting code corresponds to the data sub-block; and
extracting an encoded A/V signal from each sub-block for which no error was detected.

8. A method of decoding an A/V signal in the form of a stream of frames as claimed in claim 7, wherein the method includes concealing an error in a data sub-block of the stream by generating an estimated sub-block from at least one neighboring sub-block with no errors.

9. A decoding apparatus including:
an input for receiving a frame including a header block, an associated header error protection code, and a plurality of data sub-blocks and respective associated sub-block error protection codes; the header block including information on the data sub-blocks in the frame; the information including location information on the location of at least one of data sub-blocks in the frame; each of the data sub-blocks corresponding to predetermined consecutive periods of the A/V signal, the sub-blocks may have a variable length; and
a decoder including:
means for verifying whether the header error protecting code corresponds to the header block, and terminating processing of the frame if no correspondence is found;
means for locating the data sub-blocks at least partially under control of the location information in the header block;
means for verifying for each of the respective data sub-blocks whether the respective associated sub-block error protecting code corresponds to the data sub-block; and
means for extracting an encoded A/V signal from each sub-block for which no error was detected.

10. A decoder apparatus as claimed in claim 9, including a read device for reading frames from a storage medium and feeding the read frames to the decoder.

11. A decoder apparatus as claimed in claim 10, including means for receiving a removable storage medium; the reader being operative to read the frames from the removable storage medium.

12. A storage medium for use in a decoder apparatus as claimed in claim 11 on which a plurality of the frames are stored.

* * * * *